United States Patent [19]

Bird

[11] 4,142,076
[45] Feb. 27, 1979

[54] ELECTRICAL SWITCH
[75] Inventor: Stephen J. Bird, Burnley, England
[73] Assignee: Lucas Industries Limited, Birmingham, England
[21] Appl. No.: 790,943
[22] Filed: Apr. 26, 1977
[30] Foreign Application Priority Data
  Apr. 27, 1976 [GB] United Kingdom ............... 16953/76
[51] Int. Cl.² .............................................. H01H 9/00
[52] U.S. Cl. ...................................... 200/4; 200/6 R; 200/61.27; 200/61.54
[58] Field of Search ............ 200/4, 6 R, 61.27, 61.54, 200/277

[56] References Cited
U.S. PATENT DOCUMENTS

| | | | |
|---|---|---|---|
| 3,331,932 | 7/1967 | Winogrocki et al. ............... | 200/4 X |
| 3,604,975 | 9/1971 | Suzuki et al. .................. | 200/61.54 X |
| 3,629,524 | 12/1971 | Cryer ........................... | 200/61.54 X |
| 3,718,784 | 2/1973 | Wilkinson ........................ | 200/61.27 |

Primary Examiner—James R. Scott
Attorney, Agent, or Firm—Holman & Stern

[57] ABSTRACT

An electrical switch including a body and a rotor mounted on the body for movement relative thereto about first and second spaced and generally mutually perpendicular axes. First and second fixed electrical contacts are carried by the body and are engageable by a first movable contact carried by the rotor. A plunger is movable generally parallel to the first axis by movement of the rotor about the second axis and a second movable contact carried by the plunger is engageable with a further fixed contact on the body. A conductive wire spring including a pair of resilient limbs which, in a rest position of the spring, are resiliently biassed in opposite directions respectively into engagement with the first fixed contact, has one of its limbs movable against its inherent bias by the rotor, during movement of the rotor about the first axis so as to engage the second fixed contact whereby the spring bridges the first and second fixed contacts. A permanent electrical connection exists between the first fixed contact and the second movable contact by way of the wire spring and the plunger.

3 Claims, 2 Drawing Figures

ELECTRICAL SWITCH

SUMMARY OF THE INVENTION

This invention relates to an electrical switch of the kind including a body, a rotor mounted on the body for movement relative thereto about first and second spaced and generally mutually perpendicular axes, first and second fixed electrical contacts carried by the body and engageable by a first movable contact carried by the rotor in one angular position of the rotor about the first axis, a plunger movable generally parallel to the first axis by movement of the rotor about the second axis, a second movable contact carried by the plunger and engageable with a further fixed contact on the body and a conductive wire spring including a pair of resilient limbs which, in a rest position of the spring, are resiliently biassed in opposite directions respectively into engagement with the first fixed contact, one of the limbs being movable against its inherent bias by the rotor, during movement of the rotor about the first axis, to engage the second fixed contact whereby the spring bridges the first and second fixed contacts.

According to the invention in a switch of the kind specified above, a permanent electrical connection exists between the first fixed contact and the second movable contact by way of the wire spring and said plunger.

Preferably, the plunger is in sliding contact with the spring so that the electrical connection therebetween is not disrupted by the movement of the plunger relative to the body and the spring. Conveniently, the spring includes a loop integrally uniting the limbs. The plunges passes through the loop.

BRIEF DESCRIPTION OF THE DRAWING

One example of the invention is illustrated in the accompanying drawings, wherein.

DETAILED DESCRIPTION OF A PREFERRED EMBODIMENT

Figure 1:
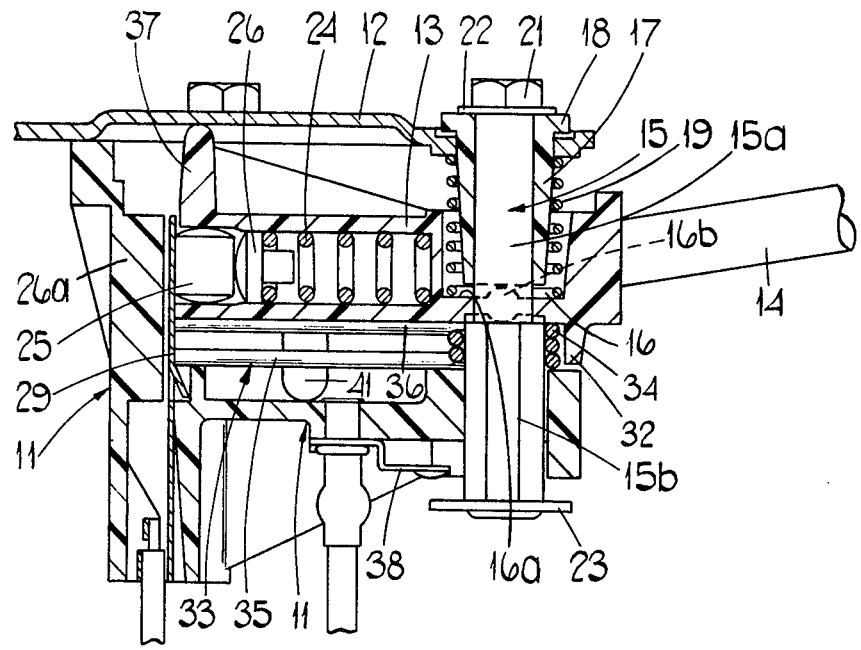
FIG. 1 is a side elevational view, mainly in section of an electrical switch.

Referring to the drawings, the electrical switch include a hollow, moulded synthetic resin body 11 having a metallic cover plate 12 closing an open face thereof. Within the body 11 is a moulded synthetic resin rotor 13 having extending therefrom an operating stalk 14. The stalk 14 projects from the body 11 to facilitate movement of the rotor 13 relative to the body 11.

A brass plunger 15 having a plain cylindrical region 15a and a region 15b of hexagonal cross-section is supported for axial sliding movement relative to the body 11 by having its region 15b slidably received in a bore in the body 11. The free end of the region 15b projects from the body 11 and the region 15a passes through the rotor 13 and the cover 12. The rotor 13 has a bore 16 therein through which the plunger 15 passes. Throughout the majority of its length the bore 16 is of considerably greater diameter than the diameter of the region 15a of the plunger 15, but adjacent the junction of the regions 15a, 15b the diameter of the bore 16 is reduced to a diameter such that the bore is a relatively close fit on the region 15a. A radially extending shoulder 16a is defined at the junction of the two regions of the bore 16, and disposed in diametric alignment on the shoulder 16a are two parts of a rib 16b of part circular cross section.

The region 15a of the plunger 15 extends through a clearance aperture in the cover 12 and encircling the region 15a is a moulded synthetic resin sleeve 17. The sleeve 17 passes through the clearance aperture in the cover 12 and externally of the cover 12 includes an integral, radially outwardly extending circumferential flange 18. The sleeve 17 terminates at its opposite end in abutment with the rib 16b and acting between the inner surface of the cover 12 and the rib 16b is a helically wound compression spring 19 which encircles the sleeve 17. The free end of the region 15a of the plunger 15 is formed with a screw threaded bore which receives a short bolt 21 which in turn clamps a washer 22 against the free end of the region 15a. The diameter of the washer 22 is in excess of the diameter of the region 15a and so overlies part of the flange 18 of the sleeve 17. A brass washer 23 is physically and electrically connected to the free end of the region 15b of the plunger 15 by rivetting or staking.

Figure 2:
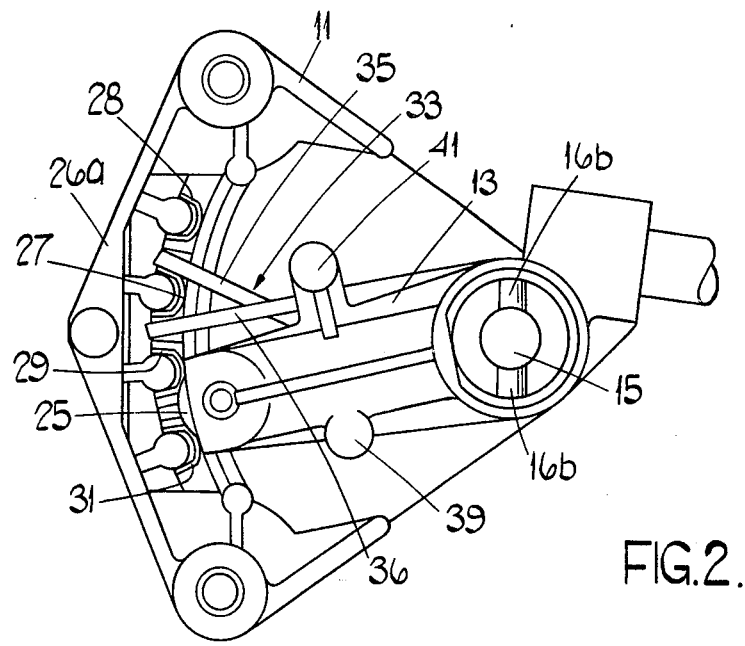
FIG. 2 is a plan view of the switch shown in FIG. 1 with the top cover thereof removed.

The rotor 13 extends beyond the plunger 15 into the body 11 and is formed with a bore 24 extending generally transverse to the axis of the plunger 15. A conductive metal roller 25 is received by the bore and is urged outwardly of the bore by a spring pressed plunger 26. The rotor 13 terminates adjacent a side wall of the body 11, the side wall 30 supporting four fixed electrical contacts 27–29 and 31. The four fixed contacts extend parallel to the axis of the plunger 15 and are equiangularly spaced from one another in an arc of a circle having its centre on the axis of the plunger 15. Each of the fixed contacts includes an integral terminal through which a respective lead is secured, the leads extending from the face of the body remote from the cover 12. Furthermore, each contact is of arcuate cross-section and the spacing between contacts is less than the diameter of the roller 25. Thus the roller 25 is urged outwardly of the rotor 13 by the spring pressed plunger 26 and engages adjacent pairs of the contacts 27–29 and 31 dependent upon the angular position of the rotor 13 about the axis of the plunger 15 relative to the body. As shown in FIG. 2 the roller 25 engages and thus electrically interconnects the contacts 29 and 31. It will be understood that by rotating the rotor about the axis of the plunger 15 is a clockwise direction (in FIG. 2) the rotor can be moved to cause the roller 25 to bridge the contacts 27 and 29 or the contacts 27 and 28. As the rotor is moved to cause the roller 25 to ride over one of the contacts, compression of the spring acting on the plunger 26 occurs and thus the spring pressed roller 25 and the contacts 27–29 and 31 constitute a detent means defining three angularly spaced stable positions of the rotor 13 relative to the body.

As can be seen in FIG. 1 each of the contacts 27–29 and 31 has a resilient barb which engages an internal shoulder of the body to resist withdrawal of the contact from the body. Similarly each of the contacts includes a surface which abuts a surface of the body to prevent movement of the contact relative to the body in the opposite direction. Thus the contacts are locked in position in the body and as is clear from FIG. 2 are supported on regions of the wall 26a of external shape similar to the internal shape of the contacts.

The rotor 13 includes an integral foot 32 which can abut the body 11 to limit the movement of the rotor 13 in the direction of the axis of the plunger towards the body 11. Encircling the region 15b of the plunger between the rotor 13 and the adjacent face of the body 11, is the loop 34 of a conductive hair-pin type wire spring 33. The ends of the loop 34 of the spring 33 extend towards the wall 26a defining two resilient limbs 35 and 36 which cross one another intermediate their ends. The free end of the limb 35 passes between the fixed contacts 27 and 28 while the free end of the limb 36 passes between the fixed contacts 27 and 29. The inherent resilience of the crossed over limbs 35 and 36 is such that both limbs are biassed, in opposite directions respectively, against the contact 27 and thus in the absence of any other influence on the spring 33 both limbs engage only the contact 27.

The loop 34 of the spring is not a tight fit around the region 15b of the plunger 15, and thus the plunger 15 can slide through the loop 34. However, it will be understood that since the crossed over limbs are both biassed in opposite directions against the contact 27 by their own inherent resilience, there will be a scissor like action between the limbs and the contact 27 urging the spring towards the plunger 15. Thus the loop 34 although relatively loose around the region 15b of the plunger nevertheless always abuts the plunger and thus an electrical connection exists between the contacts 27 and the plunger 15 by way of the spring 33.

The rotor 13, at its end remote from the stalk 14, is formed with an integral projection 37 which engages the inner surface of the cover 12. A further fixed contact 38 is riveted to the exterior of the body 11 adjacent the plunger 15, the contact 38 being a leaf spring contact and being engageable by the washer 23 as a result of axial movement of the plunger.

It will be recognised from the foregoing description that the rotor can be moved relative to the body 11 in two distinct planes. Firstly, the rotor can be pivoted relative to the body 11 about the axis of the plunger 15 to cause the roller 25 to bridge different pairs of the fixed contacts 27-29 and 31. Alternatively the rotor 13 can be pivoted relative to the body 11 about an axis passing through the point of engagement of the pair of posts 39 and 41 on the rotor with the body 11. Such movement of the rotor 13 takes place from the rest position shown in FIG. 1, against the action of spring 19, the sleeve 17 being moved with the rotor against the action of the spring 19. It will be recalled that the flange 18 of the sleeve 17 is engaged by the washer 22 secured to the plunger 15, and thus the axial movement of the sleeve 17 is accompanied by axial movement of the plunger 15 relative to the body. The axial movement of the plunger 15 carries the washer 23 from a position spaced from the fixed contact 38 to a position wherein the washer 23 engages the fixed contact 38. Thus, this movement of the rotor 13 serves to make an electrical connection between the electrical lead secured to the contact 27 and the lead secured to the fixed contact 38 by way of the spring 33 and the plunger 15. Upon release of the rotor 13, it is returned towards its rest position by the spring 19. The plunger 15 and the sleeve 17 are returned to their rest positions thus disengaging the washer 23 from the fixed contact 38 by abutment between the rotor 13 and a step on the plunger at the junction of the regions 15a, 15b thereof.

The purpose of the spring 33 in the switch is twofold. The posts 39 and 41 are interengaged with the rotor and are spaced from one another, the post being engageable respectively with the limbs 35 and 36 at the side of their cross over point remote from the contact 27. As can be seen in FIG. 2, the post 41 is closely adjacent the limb 36 in the position of the rotor where the roller 25 bridges the contact 29 and 31. The rotor can be moved in an counter-clockwise direction beyond this position so that the roller 25 rides up onto the contact 31, and thus does not complete any electrical connection within the switch. Furthermore, it will be realized that engagement of the roller 25 solely with the contact 31 represents an unstable position of the rotor 13 relative to the body, from which the rotor will be moved by the combined action of the roller and spring pressed plunger when the rotor is released.

However, this movement of the rotor 13 to the unstable position engages the post 41 with the limb 36 of the spring 33 and results in flexure of the limb 36 by the post 41 into engagement with the contact 29. Thus, the limb 35 of the spring remains in contact with the contacts 27, while the limb 36 engages the contact 29. Although the roller 25 is not making an electrical connection in this position of the rotor, the spring 33 bridges the contacts 27 and 29.

In the movement of the rotor 13 to the position where the roller 25 bridges the contacts 27 and 28, the post 39 engages the limb 35 of the spring. The arrangement is such that as the rotor achieves its stable position wherein the roller bridges the contacts 27 and 28. The limb 35 is flexed by the post 39 to engage the contact 28. Thus, the limb 36 remains engaged with the contacts 27 and the contacts 27 and 28 are bridged simultaneously by the roller 25 and the spring 33.

It will be apparent therefore, that at all times one or other of the limbs of the spring 33 is engaged with the contact 27 and thus the electrical connection between the washer 23 and the contact 27 by way of the spring 33 and the plunger 15 is a permanent electrical connection.

In one particular embodiment of the switch described above, the switch is used to control operation of a self-parking two-speed permanent magnet windscreen wiper motor, and also the electric motor of a windscreen washer pump. The contact 27 of the switch is an electrical feed contact. The contact 28 is connected in the fast speed circuit of the motor. The contact 29 is connected in the slow speed circuit of the motor. Thus when the contacts 27 and 29 are bridged the motor is operated at slow speed and when the contacts 27 and 28 are bridged the motor operates at a fast speed. The contact 31 is connected through one set of contacts in a parking switch of the wiper motor to earth, so that when the rotor is moved to a position where the roller bridges the contacts 29 and 31 then when the wipers associated with the windscreen wiper reach the end of a complete wiping stroke then the parking switch is operated resulting in the armature of the windscreen wiper motor being short circuited to achieve dynamic braking of the motor. Thus the position of the rotor where the roller 25 bridges the contacts 29 and 31 is an off position as far as the wiper motor is concerned but by moving the rotor 13 beyond the off position to the unstable position the slow speed circuit is again completed, but this time by way of the spring 33. Immediately the motor starts to operate. The parking switch is operated to maintain the feed to the armature of the wiper motor regardless of the position of the rotor 13 until the wipers have performed a further complete stroke. Thus, with the rotor 13 in the off position momentarily, moving the rotor 13 to its unstable position will cause the wipers of the vehicle to perform a complete operating stroke and then stop.

As mentioned above in the position of the rotor 13 where the contacts 27 and 28 are bridged by the roller 25 they are also bridged by the spring 33. When manufacturing the switch, in order that the rotor 13, can move freely, without impediment, into the position wherein the roller 25 bridges the contacts 27 and 28 sufficient clearance is left in an angular direction, between the rotor and the body to ensure that the rotor does not abut the body in the position where the roller 25 sits in engagement with the contacts 27 and 28. It will be understood, therefore, that if pressure is applied to the lever 14 to move the rotor 13 further in the angular direction in which it is moved to achieve this position of the rotor, then the rotor can be moved beyond the stable position before its movement is prevented by abutment with the body. As a result of tolerances in the manufacture of the components of the switch, the permitted further angular movement may well be sufficient to disengage roller 25 from the contact 27. However, this will not break the fast speed circuit of the wiper motor since the circuit will be maintained by way of the spring 33. In practice, it is found that additional movement of the rotor 33 can occur when the operator rests his hand on the lever 14 as some vehicle drivers are bound to do.

The contact 38 is connected in use in the circuit of the washer pump motor and movement of the plunger 15 to engage washer 23 with contact 38 completes a circuit through the switch from contact 27 to contact 38 to energise the washer pump motor. The rotor 13 can be moved to energise the pump motor in use in any of the positions of the rotor about the axis of the plunger 15.

What is claimed is:

1. An electrical switch comprising:
   a body;
   a rotor mounted on the body for movement relative thereto about first and second spaced and generally mutually perpendicular axes;
   first and second fixed electrical contacts carried by the body;
   a first moveable contact carried by the rotor and engageable with said fixed electrical contacts in one angular position of the rotor about said first axis;
   a plunger movable generally parallel to said first axis by movement of the rotor about said second axis;
   a second movable contact carried by the plunger and engageable with a further fixed contact on the body;
   a conductive wire spring including a pair of resilient limbs which in a rest position of the spring, are resiliently biassed in opposite directions respectively into engagement with said first fixed contact, said rotor including means for biassing one of said limbs, one of said limbs being movable against its inherent bias by the means during movement of the rotor about the first axis, for engaging said second fixed contact whereby the spring bridges said first and second fixed contacts; and
   means for providing permanent electrical connection between said first fixed contact and said second movable contact said means for providing comprising said wire spring and plunger.

2. A switch as claimed in claim 1, wherein the plunger is in sliding contact with said spring so that said electrical connection therebetween is not disrupted by said movement of the plunger relative to the body and the spring.

3. A switch as claimed in claim 1 wherein the spring includes a loop integrally uniting said limbs, said plunger passing through said loop.

* * * * *